Feb. 19, 1963 H. F. RIETH 3,077,856

SIGNALLING SYSTEM

Filed April 19, 1960 3 Sheets-Sheet 1

INVENTOR:
Harold F. Rieth
By Smyth, Roston & Pavitt
Attorneys.

INVENTOR:
Harold F. Rieth
By Smyth, Roston & Pavitt
Attorneys.

Feb. 19, 1963 H. F. RIETH 3,077,856

SIGNALLING SYSTEM

Filed April 19, 1960 3 Sheets-Sheet 3

INVENTOR:
Harold F. Rieth
By Smyth, Roston & Pavitt
Attorneys.

United States Patent Office 3,077,856
Patented Feb. 19, 1963

3,077,856
SIGNALLING SYSTEM

Harold F. Rieth, Pasadena, Calif., assignor to Packard-Bell Electronics Corporation, Los Angeles, Calif., a corporation of California
Filed Apr. 19, 1960, Ser. No. 23,286
15 Claims. (Cl. 116—137)

This invention relates to apparatus for obtaining the transmission of energy to a removed position to produce a control effect at the removed position. The invention particularly relates to apparatus for obtaining a transmission of signals on a wireless basis from a removed position to a television receiver to provide controls over the operation of the receiver such as the particular channel being viewed at any instant. The invention especially provides relatively simple apparatus which includes at least one vibrator constructed to vibrate in a longitudinal mode and to transmit signals at a particular frequency in accordance with such vibrations.

In the operation of certain systems, it is desirable to control the operation of the systems from positions which are limited distances away from the systems to be controlled. For example, it may often be desirable to control the operation of a television receiver on a first side of a family room from a position on the opposite side of the room. Such a control may be desirable in order to allow the television viewer to change the operation of the receiver without having to approach the receiver from a comfortable seat displaced from the receiver. By way of illustration, the viewer may desire to change the television channel being viewed at any instant or to vary the intensity of the sound emanating from the receiver at that instant.

Systems have been devised for controlling the operation of a television receiver on a remote basis. Such systems use tuning rods which are constructed to vibrate in a longitudinal mode and to transmit signals in accordance with the production of such vibrations. The vibrations in the tuning rods occur at an ultrasonic frequency so as not to affect the fidelity of the sound produced in the television receiver.

Although the remote control units using such vibrators have provided adequate controls over the operation of the television receivers, the remote control units have had certain disadvantages. For example, the remote control units now in use are relatively complicated in their construction in providing a plurality of springs and other components in association with the springs to produce vibrations in the tuning rod. One spring is required to hold the tuning rod in fixed position; a second spring is required to displace a striker from the tuning rod upon a tensioning of the second spring and to produce an impact between the striker and the tuning rod upon the release of the tension on the second spring; and a third spring is required to return the striker and the associated members to their initial positions.

By requiring the remote control units now in use to have a plurality of springs and a complicated structure in association with the springs to produce vibrations in a tuning rod, a relatively complex and expensive construction has resulted. Furthermore, since a plurality of springs and a number of members in combination with the springs have had to be manually operated by the viewer in order to produce vibrations in the tuning rod, a considerable force has had to be manually exerted. This force has been especially burdensome to ladies and to young children because it has sometimes exceeded the physical capabilities of such viewers.

Another difficulty has resulted from the use of the spring in holding the tuning rod in fixed position to receive the impact of the striker. The use of this spring has required a groove to be formed around the periphery of the tuning rod so that the spring can be retained within the group. Because of the formation of the groove in each tuning rod, the frequency of the vibrations in the tuning rod cannot be accurately predicted. This has required that complicated procedures be instituted in producing each tuning rod to insure that the frequency of vibrations in the tuning rod be maintained within the narrow limits required for the tuning rod.

This invention provides a remote control unit which is especially adapted for use in conjunction with television receivers and which is constructed to overcome the disadvantages of the remote control units now in use. The remote control unit constituting this invention uses only one resilient member such as a spring to obtain a displacement between a striker and a tuning rod upon a constraint of the resilient member and to obtain an impact between the striker and the tuning rod upon a release of the constraint on the resilient member. The remote control unit constituting this invention is so constructed that the resilient member returns automatically to its initial position upon the release of the constraint on the resilient member and without requiring the use of any additional resilient members such as springs to return the first resilient member to the relaxed position.

The remote control unit constituting this invention uses a minimum number of components to produce vibrations in a tuning rod. For example, in one embodiment of the invention, a striker is disposed near one end of a resilient member such as a spring. The spring is fixedly supported at the other end to produce a pivotal constraint of the spring. The striker becomes displaced from the tuning rod upon a pivotal constraint of the spring and becomes moved into impact with the tuning rod upon a release of the pivotal constraint on the spring. A control member such as a manually operated knob is disposed against a first end of the spring to produce a pivotal constraint of the spring upon an initial displacement of the control member in a particular direction and to produce a release of the pivotal constraint on the spring upon a further displacement of the control member in the particular direction.

The tuning rod is supported in a novel manner in the remote control unit constituting the invention. Specifically, the tuning rod is disposed in an opening in a member which may be made from a suitable elastic material such as sponge rubber. The tuning rod is permanently bonded in the opening in the elastic member as by glue or by molding the elastic material to the tuning rod. The tuning rod is bonded to the elastic member along extended lengths around the periphery of the tuning rod. By supporting the tuning rod in this manner, the elastic member may be considered to provide a proper damping action on the tuning rod so that the vibrations in the rod continue for only a proper length of time after each impact between the striker and the tuning rod.

Figures 1, 4:
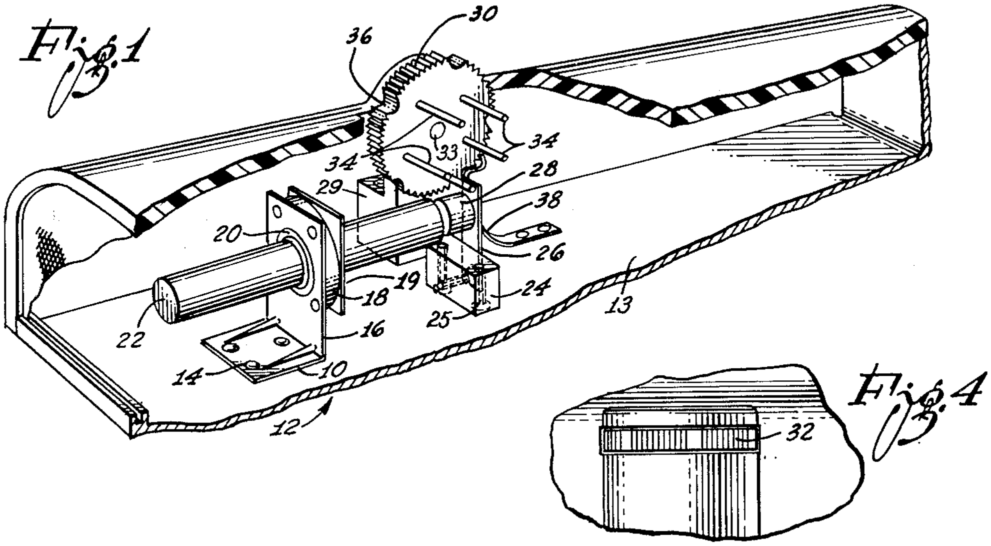
FIGURE 1 is a fragmentary perspective view of apparatus constituting one embodiment of this invention and including a tuning rod which is constructed to obtain a transmission of control signals at a particular frequency to a remote position, the apparatus shown in FIGURE 1 including a housing which is partially broken away to indicate components within the housing in some detail.
FIGURE 4 is an enlarged fragmentary sectional view substantially on the line 4—4 of FIGURE 3 and illustrates a control member such as a manually rotatable knob which is included in the apparatus shown in FIGURES 1, 2 and 3.

In the embodiment of the invention shown in FIGURES 1 to 4, inclusive, a first portion of a bracket 10 is fixedly attached as by screws 14 to the bottom wall 13 of a housing generally indicated at 12. The bracket 10 has a second portion 16 substantially perpendicular to the first portion. A resilient member 18 made from a pliant and elastic material such as sponge rubber is suitably supported on the second portion of the bracket 16. The resilient member 18 is provided with properties to return to a particular configuration upon becoming deformed from this particular configuration. The resilient member 18 is supported between the portion 16 of the bracket 10 and a plate 19 disposed in spaced and parallel relationship to the portion 16 of the bracket 10.

The resilient member 18 is provided with an opening such as a cylindrical hole 20. A vibrator such as a tuning rod 22 is disposed within the opening 20 and is permanently attached to the resilient member 18 as by molding the member 18 to the tuning rod 22 or by cementing or gluing the member 18 to the tuning rod. The tuning rod 22 is bonded to the resilient member 18 at an intermediate position along the length of the tuning rod. The tuning rod 22 is bonded to the resilient member 18 so that the material in the resilient member extends into pores in the tuning rod along extended lengths around the complete periphery of the tuning rod. These extended lengths preferably comprise all or a major portion of the periphery of the tuning rod 22. As an alternative, they may comprise a plurality of spaced arcs each extending through a few angular degrees. Under the latter circumstances, the resilient member 18 has a plurality of elastic spokes which extend radially to the periphery of the tuning rod 22 for bonding to the tuning rod.

The tuning rod 22 is preferably provided with a cylindrical configuration having an axial length dependent upon the particular frequency of the signals to be transmitted by the rod. These frequencies are preferably in the ultrasonic range so as not to interfere with the fidelity of the sound and picture which are obtained from a television receiver when the apparatus shown in FIGURES 1 to 4, inclusive, is used to control the operation of the television receiver on a remote basis. The rod 22 is from a suitable material such as aluminum and is constructed to produce vibrations in a longitudinal mode. The length of the rod 22 preferably corresponds to substantially one-half of a wave length of the longitudinal vibrations produced in the tuning rod.

A support member 24 is attached to the bottom wall 13 of the housing 12 in longitudinally spaced relationship to the bracket 10. The member 24 supports as at 25 a first end of a resilient member such as a spring 26. The spring 26 preferably constitutes a leaf spring such that the spring becomes pivotally constrained from an initial position of rest upon the exertion of a longitudinal force against the spring and becomes returned to the position of rest upon the release of this longitudinal force. It will be appreciated, however, that other types of springs such as a helical spring may also be used and that the helical spring may be pivoted in a manner similar to the leaf spring.

A striker 28 is supported by the leaf spring 26 at a position near the upper (or free) end of the spring. The striker 28 is formed from cold rolled steel and is preferably provided with a cylindrical configuration illustratively having an axial length of approximately ¼ inch and a radius of approximately ¼ inch. The striker 28 is disposed in facing relationship to one end of the tuning rod 22 and in slightly spaced relationship to the tuning rod in the position of rest of the leaf spring 26.

A support block 29 is attached to the bottom wall 13 of the housing 12 as by screws 31 and a pin 33 is journalled in the support block. A control member such as a manually rotatable knob 30 is mounted on the pin 33 for rotation and is disposed in operatively coupled relationship to the upper end of the leaf spring 26 to obtain a pivotal constraint of the leaf spring in the longitudinal direction. The knob 30 is shown as extending at least partially through the upper end of the housing 12 and is disposed so that it can be manually rotated in the longitudinal direction. Preferably, the knob 30 is knurled as at 32 (FIGURE 4) to facilitate a manual rotation of the knob.

Figure 2:
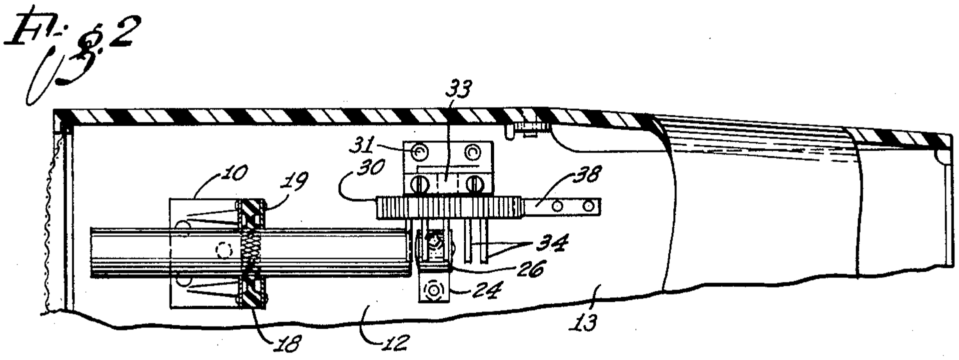
FIGURE 2 is a fragmentary top plan view of the apparatus shown in FIGURE 1, the housing for the apparatus being partially broken away to show the elements within the housing in detail.
Figure 3:
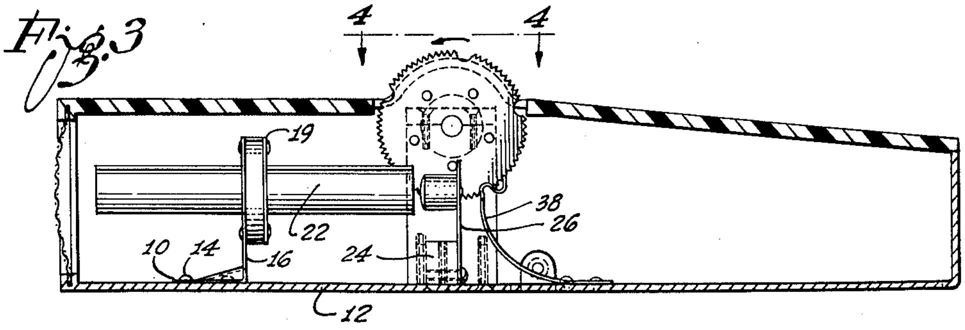
FIGURE 3 is a front elevational view of the apparatus shown in FIGURES 1 and 2, the housing for the apparatus being broken away to show the elements within the housing in detail.
Figure 5:
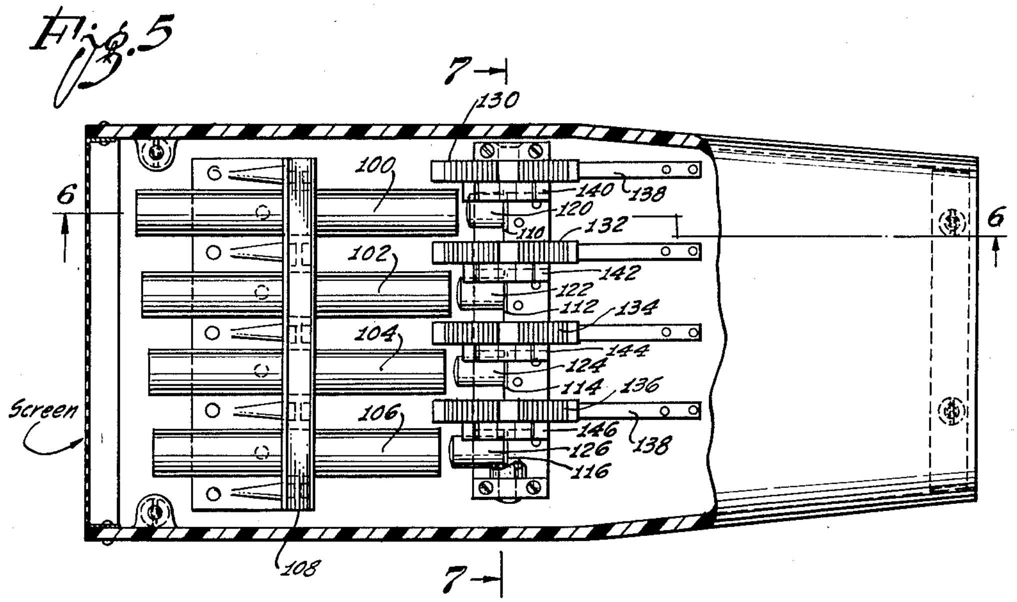
FIGURE 5 is a top plan view of apparatus constituting a second embodiment of the invention with a portion of the housing for the apparatus being broken away to illustrate components within the housing in detail, such apparatus including a plurality of tuning rods for transmitting signals at individual frequencies to obtain different controls at the remote position.

A plurality of actuating portions such as pins 34 extend laterally from the side of the knob 30 at angularly spaced positions. The pins 34 engage the upper end of the spring 26 upon a rotation of the knob 30 in a counterclockwise direction in FIGURE 1 so as to obtain a pivotal movement of the spring 26 toward the right in that figure. Although a plurality of pins 34 are shown in FIGURES 1, 2 and 3, it will be appreciated that only one pin may be used if it should be desired to rotate the knob 30 through an angle of 360° for each actuation of the tuning rod 22.

The knob 30 is provided with a plurality of grooves 36 in its periphery. The number of grooves 36 corresponds to the number of pins 34, and the grooves 36 have an angular spacing corresponding to that of the pins 34. One end of a leaf spring 38 rides along the periphery of the knob so as to enter the grooves 36 as the knob is manually rotated. The other end of the leaf spring 38 is attached as by screws to the bottom wall of the housing 12. Instead of riding on the periphery of the knob 30, the free end of the spring 38 may engage successive ones of the pins 34 as the knob 30 is rotated.

The knob 30 is manually rotated only in a particular direction such as a counterclockwise direction because of the action of the spring 38. As the knob 30 is manually rotated in a counterclockwise direction, the pin 34 in abutting relationship to the upper end of the leaf spring 26 pivots the leaf spring toward the right in FIGURE 1 to produce a pivotal constraint of the spring. Continued rotation of the knob 30 in the counterclockwise direction causes the particular pin 34 engaging the upper end of the leaf spring 26 to slide past the leaf spring so that the leaf spring becomes released from its pivotal constraint.

When the leaf spring 26 becomes released from its pivotal constraint, it pivots toward the left in FIGURE 1 and causes the striker 28 to impinge against the right end of the tuning rod in that figure. The impact between the tuning rod 22 and the striker 28 produces vibrations at the ultrasonic frequency in the tuning rod. These vibrations cause signals to be transmitted from the tuning rod 22 at a frequency related to the frequency of the vibrations in the tuning rod. The signals are received at a unit displaced from the tuning rod 22 so as to control the operation of a television receiver. For example, the signals are used to automatically turn the receiver on or off or to automatically change the channel being viewed in the television receiver at any instant.

The vibrations produced in the tuning rod 22 by the impact of the striker 28 against the tuning rod continue only for a controlled period of time. This results in part from the natural tendency of the vibrations in the tuning rod 22 to become damped. It also results in part from the damping action produced as a result of the bonding of the resilient member 18 to the periphery of the tuning rod 22 at an intermediate position along the length of the rod. The amount of damping can be controlled either by varying the stiffness of the elastic material constituting the resilient member 22 or by varying the area of contact between the tuning rod 22 and the resilient member 18.

The vibrations in the tuning rod 22 continue for a sufficient length of time, for example, to obtain an advance only from one channel to the next in the television receiver. Production of the vibrations in the tuning rod 22 for an insufficient length of time prevents an advance of even a single channel in the television receiver. Production of the vibrations for an excessive length of time causes the television receiver to be advanced through more than a single channel upon each production of vibrations in the tuning rod 22. This is undesirable since the viewer may desire to view the first of the two or more channels through which the channel selector has advanced.

The combination of the resilient member 18 with the tuning rod 22 provides certain additional advantages. This results from the fact that the permanent bonding between the resilient member 18 and the tuning rod 22 does not require that any grooves be produced in the periphery of the tuning rod as in the prior art. Since no grooves have to be provided in the periphery of the tuning rod 22 in the apparatus constituting this invention, the frequency of the vibrations in the tuning rod 22 can be predicted with considerably greater accuracy than in the prior art. This means that the tuning rod 22 in the apparatus constituting this invention can be easily produced in comparison to the tuning rods used in the prior art and can be produced without any necessity of performing such esoteric operations as drilling holes of variable depth in the tuning rod to control the frequency of the tuning rod. Since no grooves in the external periphery and no internal holes are produced in the tuning rod 22 in the apparatus constituting this invention, signals of relatively great strength are also obtained from the tuning rod.

The knob 30 is rotated through only a particular angular distance each time that a remote control is to be provided over the operation of a remote unit such as a television receiver. The rotation of the knob 30 through only the particular distance is controlled by the action of the spring 38 in riding on the periphery of the knob 30. The control results because of the increased force required to operate the knob 30 when the end of the spring 38 enters one of the grooves 36 in the periphery of the knob.

The apparatus constituting this invention also has another important advantage over the remote control units of the prior art. This results from the fact that a manual rotation of the knob 30 can be obtained primarily by overcoming the force of a single spring such as the leaf spring 26. The force of only the leaf spring 26 has to be overcome since the leaf spring 38 serves primarily as a detent member to prevent the knob 30 from rotating in a clockwise direction in FIGURES 1 and 3. This is in contrast to the use in the prior art of a plurality of springs, all of which have had to be driven by a manually movable member. The ease of operating the knob 30 is also facilitated by the fact that the knob has to drive a minimum number of components, these constituting the leaf spring 26 and the striker 28. Although the leaf spring 38 is also included in the embodiment shown in FIGURES 1 to 4, inclusive, the force exerted by the leaf spring 38 against the manual rotation of the knob 30 is not nearly as great as that exerted by the leaf spring 38. Furthermore, leaf spring 38 is shown only by way of example since it will be appreciated that other arrangements for limiting the rotation of the knob 30 may also be used.

FIGURES 5 to 8, inclusive, illustrate a second embodiment of the remote control unit constituting this invention. This embodiment includes a plurality of tuning rods 100, 102, 104 and 106, each provided with a different length to vibrate at an individual frequency, preferably in the ultrasonic range. Each of the tuning rods 100, 102, 104 and 106 is adapted to provide a different control at the remote position. For example, the signals transmitted by the tuning rod 100 are adapted to turn on a television receiver at a position displaced from the tuning rod, and the signals transmitted by the tuning rod 102 are adapted to turn off the television receiver.

The signals transmitted by the tuning rods 104 and 106 may be respectively adapted to advance in the forward and reverse directions the particular channel being viewed at any instant. For example, signals from the tuning rod 104 may cause the channel being viewed to be changed automatically from channel "3" to channel "4," and signals from the tuning rod 106 may cause the channel being viewed to become changed automatically from channel "3" to channel "2." The use of different frequencies to control the operation of a television receiver on a remote basis is fully described in co-pending application Serial No. 803,215, filed March 31, 1959 by Brian E. Hooper on a "Signalling System."

The tuning rods 100, 102, 104 and 106 are disposed in openings in a single resilient member 108 made from an elastic material such as sponge rubber. The tuning rods 100, 102, 104 and 106 are bonded to the resilient member 108 in a manner similar to that described above. Resilient members such as leaf springs 110, 112, 114 and 116, respectively, support strikers 120, 122, 124 and 126, which are disposed in contiguous relationship to the rods 100, 102, 104 and 106. The relationship between the tuning rods, the leaf springs and the strikers is similar to that described above for the embodiment shown in FIGURES 1 to 4, inclusive.

A plurality of control members such as manually rotatable knobs 130, 132, 134 and 136 are respectively disposed to produce a pivotal constraint of the springs 110, 112, 114 and 116 when the knobs become rotated in a particular direction such as the counterclockwise direction in FIGURE 4. The knobs 130, 132, 134 and 136 may have a disposition corresponding to the disposition of the knob 30 in FIGURES 1 to 4, inclusive.

Figure 6:
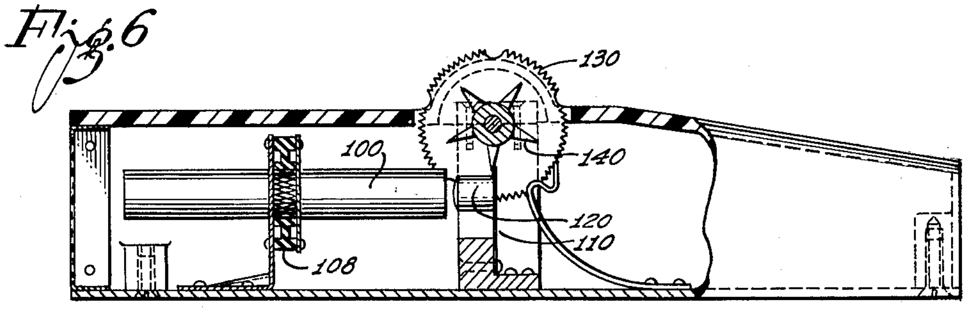
FIGURE 6 is a sectional view of the apparatus shown in FIGURE 5 and is taken substantially on the line 6—6 of FIGURE 5, the housing for the apparatus being shown in full lines at the right portion of the figure.
Figure 7:
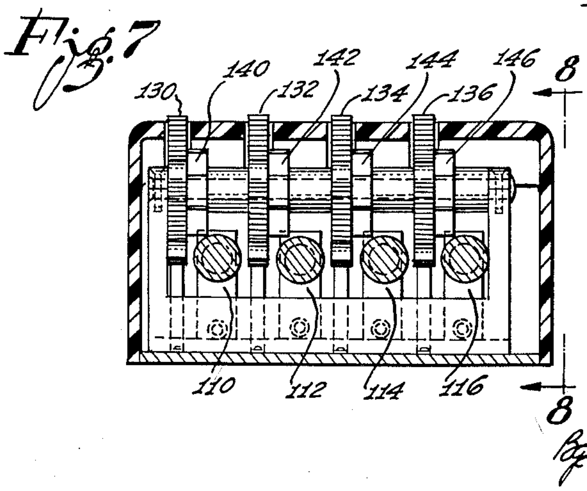
FIGURE 7 is a sectional view substantially on the line 7—7 of FIGURE 5.
Figure 8:
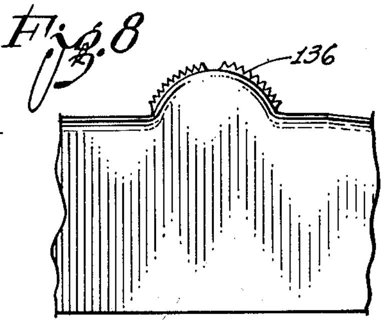
FIGURE 8 is a sectional view substantially on the line 8—8 of FIGURE 7.

The knobs 130, 132, 134 and 136 may be respectively provided with bosses such as indicated at 140, 142, 144, and 146. The bosses 140, 142, 144 and 146 respectively extend laterally from the knobs 130, 132, 134 and 136 to engage the leaf springs 110, 112, 114 and 116 and to produce a pivotal constraint of the springs as the knobs are manually rotated. Although a plurality of bosses are shown in FIGURE 6 as being provided for each control knob, it will be appreciated that only a single boss has to be included on each knob. The knobs and the bosses on the knobs may be made from a suitable material such as nylon to provide light weight, long life, easy rotation and a pleasing appearance.

Figures 9, 10, 11, 12, 13, 14, 15:
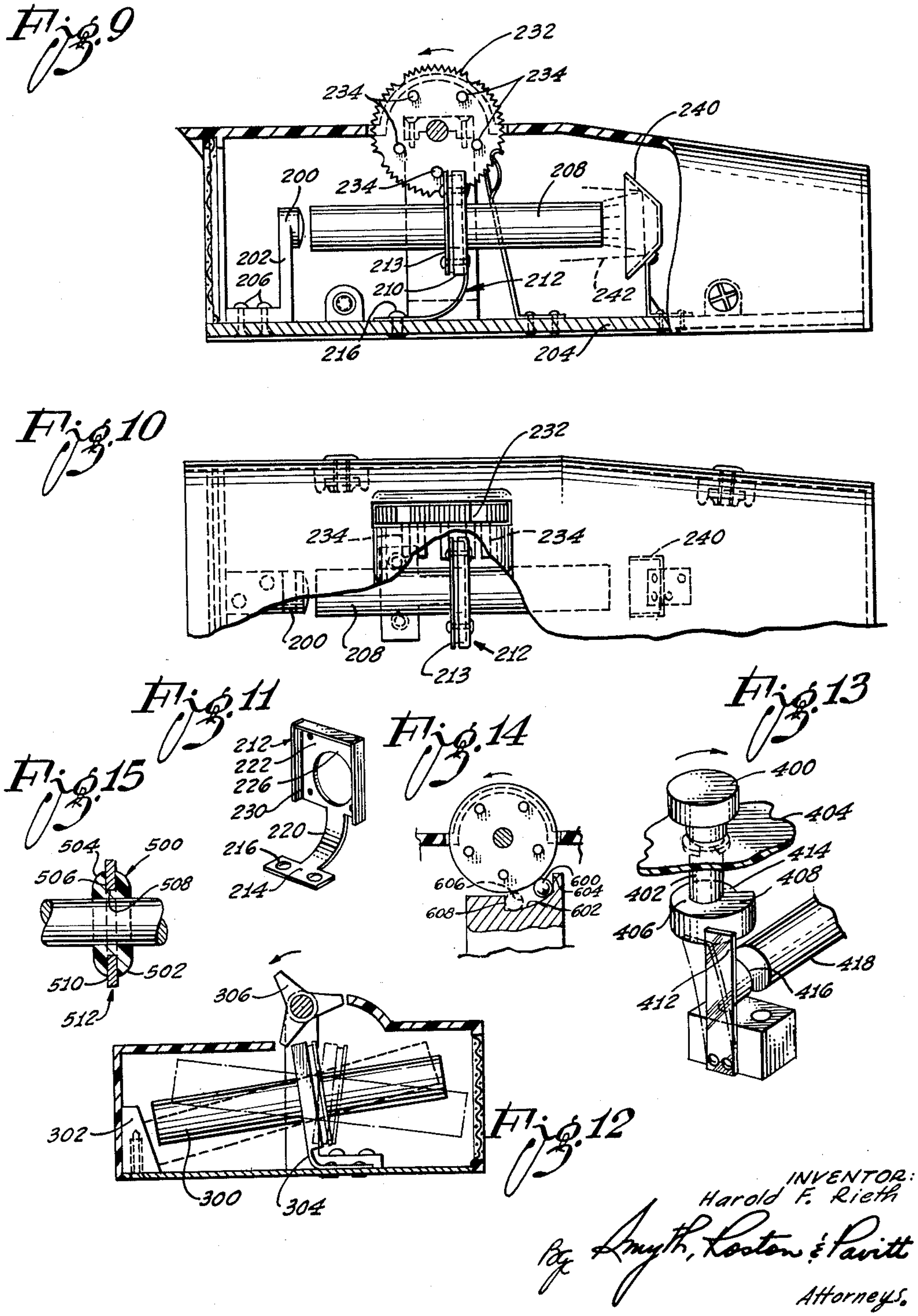
FIGURE 9 is a front elevational view of apparatus constituting a third embodiment of the invention with a portion of the housing for the apparatus being broken away to illustrate components within the housing in detail.
FIGURE 10 is a fragmentary top plan view of the embodiment shown in FIGURE 9, with a portion of the housing for the apparatus being broken away to illustrate components within the housing in detail.
FIGURE 11 is an enlarged perspective view of a resilient member such as a spring for pivotally holding a tuning rod included in the embodiment shown in FIGURES 9 and 10.
FIGURE 12 is a somewhat schematic front elevational view of apparatus constituting a fourth embodiment of the invention.
FIGURE 13 is a somewhat schematic fragmentary perspective view of apparatus which may be manually actuated to produce vibrations in the tuning rods shown in the previous figures.
FIGURE 14 is a fragmentary sectional view of a modification in one of the members included in the previous embodiments.
FIGURE 15 is a somewhat schematic view of an additional arrangement which may be substituted for certain of the members included in the previous embodiments.

In the embodiment shown in FIGURES 9 to 11, inclusive, a striker 200 may be included as part of a bracket 202, the bracket in turn being fixedly attached to the bottom wall of a housing 204 as by screws 206. A tuning rod 208 corresponding to the tuning rod 22 in FIGURES 1 to 4, inclusive, is bonded to a resilient member 210 which is made from an elastic material such as rubber and which may be constructed in a manner similar to the member 18 in FIGURES 1 to 4, inclusive.

The resilient member 210 is in turn supported by a resilient member such as a leaf spring generally indicated at 212 and may be disposed between the leaf spring and a plate 213. As may be best seen in FIGURE 11, the leaf spring 212 is provided with a base portion 214 which is provided with a relatively great lateral dimension and which is attached to the bottom wall of the housing 204 as by screws 216 (FIGURE 9). The leaf spring 212 is also provided with a portion 220 of restricted lateral dimensions at a position above the base portion 214 to facilitate pivotal constraints of the leaf spring. The upper portion 222 of the spring 212 has lateral dimensions corresponding to the lateral dimensions of the base portion 214. An opening such as a hole 226 is provided in the upper portion 222 of the spring 212 so that the tuning rod can be disposed in the hole. The upper portion 222 of the spring 212 is provided with a flange portion 230 which extends forwardly for a relatively short distance from the peripheral edges of the upper portion.

A control member, such as a knob 232, is supported by the housing 204 in a manner similar to that described previously and is provided with a plurality of actuating members such as pins 234. The pins 234 are adapted to engage the flange portion 230 of the leaf spring 212 to obtain a pivotal constraint of the spring 212 as the knob 232 is rotated in a counterclockwise direction. Further rotation of the knob 232 in the counterclockwise direction causes the pin 234 abutting the spring 212 to move past the spring 212 so that the spring becomes released from its position of pivotal constraint.

When the spring 212 becomes released from its position of pivotal constraint, it carries the tuning rod 208 toward the left in FIGURE 11 so that the tuning rod hits the striker 200. This causes vibrations to be produced in the tuning rod 208 such that signals are transmitted by the tuning rod. The signals are transmitted toward the right in FIGURE 9 and are reflected by a reflector 240 so as to be transmitted toward the left in FIGURE 9. The reflector 240 may be provided with a truncated configuration in elevational section, as best seen in FIGURE 9, or may be provided with any suitable configuration. By using the truncated reflector 240, the signals from the tuning rod 208 may be transmitted through a path indicated in broken lines at 242 in FIGURE 9.

In the embodiment shown in FIGURES 1 to 4, inclusive, the striker 28 is moved in a substantially longitudinal direction to produce an impact with the stationary tuning rod 22. In the embodiment shown in FIGURES 9 to 11, inclusive, the tuning rod 208 is moved in a substantially longitudinal direction to produce an impact with the stationary striker 200. In the embodiment shown in FIGURE 12, a tuning rod 300 is pivoted in a substantially vertical direction to hit a striker 302 when released. The tuning rod 300 may be supported by a leaf spring 304 so as to be pivoted upwardly when the spring becomes pivotally constrained by rotating a control member such as a star wheel 306.

In all the previous embodiments, the manually rotated control member such as the knob 30 in FIGURES 1 to 4, inclusive, is disposed in a vertical plane. It should be appreciated that the control member may also be disposed in a horizontal plane such as illustrated at 400 in FIGURE 13. When the control member 400 is disposed in the horizontal plane, a shaft 402 may extend through the housing 404 to obtain a rotation of a cam 406. As will be seen, the cam 406 may be provided with a portion 408 of progressively increasing diameter so as to obtain a pivotal constraint of a spring 412 as the control member 400 is initially rotated in a clockwise direction. The cam 406 may also be provided with a portion 414 having a sharply receding configuration so as to obtain a release of the spring 412 from the position of pivotal constraint as the control member 400 is further rotated in the clockwise direction. The spring 412 may carry either a striker or a tuning rod such as described fully above. In the embodiment of the invention shown in FIGURE 13, the spring 412 carries a striker 416 into impact with a tuning rod 418 when the spring becomes released from its position of pivotal constraint.

FIGURE 15 illustrates a modified arrangement for holding a resilient member generally indicated at 500 and corresponding to the resilient member 18 in FIGURES 1 to 4, inclusive. As will be seen, the resilient member 500 is in the form of a grommet such that it has two external lip portions 502 and 504 separated by a groove 506. The groove 506 in the resilient member 500 receives the edge defining a hole 508 in the upright portion 510 of a bracket 512. By providing such an arrangement, the resilient member 500 is retained by the bracket without any necessity of including a plate corresponding to the plate 19 in FIGURES 1 to 4, inclusive, and without any necessity of including studs for holding the plate, the resilient member and the bracket in fixed relationship.

As described previously, other arrangements than the spring 38 in FIGURES 1 to 4, inclusive, can be provided for insuring the rotation of the knob 30 in the proper direction and for limiting this rotation to the proper angular value. For example, the arrangement schematically shown in FIGURE 15 can be either coupled to the knob 30 or can be included in the knob 30 to replace the spring 38 and the grooves 36 in the knob.

The arrangement shown in FIGURE 14 includes a ball 600 which is rotatable in a pocket 602. The pocket 602 is shaped to obtain a movement of the ball 600 in a counter-clockwise direction without wedging the ball. After the ball 600 has been moved to the wall 604, movement of the knob 30 in FIGURES 1 to 4, inclusive, is discontinued so that the ball is able to return from the wall 604 to its position of rest, as indicated in broken lines at 606 in FIGURE 15.

When the ball 600 is moved in a clockwise direction, however, it becomes quickly wedged against a wall 608 defining the left end of the pocket. This prevents the spring 26 in FIGURES 1 to 4, inclusive, from becoming constrained and subsequently released. In this way, the striker 28 cannot impinge against the tuning rod 22 when the knob 30 is rotated in a counterclockwise direction.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination for obtaining a transmission of energy to a removed position to produce a control effect at the removed position: an elongated member constructed to vibrate at a particular frequency in an elongated mode and provided with a vibrational mode at an intermediate position in the elongated direction; a resilient member made from an elastic material and provided with an opening having dimensions corresponding to the cross-sectional configuration of the elongated member at the nodal position to provide a tight fit of the elongated member within the opening for extended lengths around the complete peripheries of the elongated member and the opening in the resilient member, the elongated member being disposed within the opening in the resilient member to provide a homogeneous relationship between the elongated member and the resilient member for the extended lengths around the complete periphery of the resilient member; and support means for the elongated and resilient members.

2. In combination for obtaining a transmission of energy to a removed position to produce a control effect at the removed position: support means, an elongated vibrator provided with pores in its periphery and constructed to vibrate in a longitudinal mode and to transmit signals at a particular frequency in accordance with such vibrations, and a support member having rubber-like properties and supported by the support means and provided with an opening to receive the elongated vibrator, the vibrator being disposed within the opening in the support member and the support member being bonded into the pores in the periphery of the vibrator to retain the vibrator within the opening in the support member.

3. In combination for obtaining a transmission of energy to a removed position to produce a control effect at the removed position: support means, a support member made from a rubber-like material and supported by the support means and provided with an opening in the member, and an elongated vibrator constructed to vibrate at a particular frequency for the transmission of signals having a frequency related to the frequency of vibrations, the vibrator being disposed within the opening in the support member and being permanently bonded to the support member in at least a plurality of spaced positions around the opening in the support member.

4. In combination for obtaining a transmission of signals to a removed position to produce a control effect at the removed position: at least first and second vibrators each having an elongated configuration and made from a material to provide vibrations in the material upon an impact of the vibrator and provided with dimensions to obtain a transmission of signals at a particular frequency upon the production of the vibrations, supporting means, a member supported by the supporting means and made from a material having elastic properties and provided with first and second openings at spaced positions respectively to receive the first and second vibrators, the vibrators having a press fit in the openings to obtain a firm contact between the member and the vibrators along extended peripheral lengths on each of the vibrators, and means operatively associated with the first and second vibrators for obtaining an impact with the vibrators for the production of vibrations in the vibrators.

5. In combination for obtaining a transmission of energy to a removed position to produce a control effect at the removed position: a first member constructed to produce vibrations upon an impact with the member and to obtain a transmission of signals at a particular frequency upon the production of such vibrations in the member, a second member disposed relative to the first member to obtain an impact with the first member for the production of vibrations in the first member, a resilient member pivotable at one end from a position of rest to a position of constraint and operatively coupled to a particular one of the first and second members to provide a displacement of the particular one of the first and second members from the other one of the first and second members in the position of constraint of the resilient member and to provide an impact between the particular one of the first and second members and the other one of the first and second members upon the release of the resilient member from the position of constraint, a control member operatively coupled to the resilient member to obtain a pivotal movement of the resilient member to the position of constraint upon an initial movement of the control member in a particular direction and to obtain a release of the resilient member from the position of constraint upon a subsequent movement of the control member in the particular direction, a pocket, and a ball disposed in the pocket and operatively coupled to the control member for displacement in the pocket in accordance with the movements of the control member, the pocket being disposed and shaped to provide for a movement of the ball in the pocket upon a movement of the control member in the particular direction and to produce a wedging of the ball in the pocket upon a movement of the control member in a direction opposite to the particular direction for a limiting of the movement of the control member in the direction opposite to the particular direction.

6. In combination for obtaining a transmission of energy to a removed position to produce a control effect at the removed position;

a housing;

support means extending from the housing and made from a material having elastic properties and provided with an opening at an intermediate position;

a first member disposed within the housing and extending through the opening in the support means and bonded to the support means and constructed to obtain a transmission of signals at a particular frequency upon the imposition of vibrations in the member;

a second member disposed within the housing relative to the first member to produce vibrations in the first member upon an impingement between the first member and the second member;

resilient means disposed within the housing and operatively coupled to a particular one of the first and second members to obtain a displacement of the particular one of the first and second members from the other one of the first and second members upon a constraint of the resilient means to obtain an impingement between the first and second members upon a release of the constraint on the resilient means; and an actuating member extending from the housing for manual actuation and operatively coupled to the resilient means anud movable from a first position through a first distance in a particular direction to obtain a constraint of the resilient means for a displacement of the particular one of the first and second members from the other one of the first and second members and movable through a second distance in the particular direction to a second position to obtain a release of the constraint on the resilient means for an impingement of the particular one of the first and second members against the other one of the first and second members, the manually operable member being disposed in the first and second positions in the same operative relationship with respect to the resilient means upon the release of the constraint on the resilient means to obtain a constraint of the resilient means upon the movement of the manually operable member through the first distance in the particular direction from the second position and to obtain a release of the constraint on the resilient means upon a further movement of the manually operable member in the particular direction.

7. In combination for obtaining a transmission of energy to a removed position to produce a control effect at the removed position:

a vibrator;

a striker disposed relative to the vibrator to strike the vibrator for the production of vibrations in the vibrator;

stationary support means;

a support member made from a pliant material and provided with an opening and supported by the stationary support means, the vibrator being disposed within the opening in the support member in homogeneous relationship to the support member, resilient means operatively connected to the striker at one end and connected to the stationary support means at the other end to obtain a constraint of the resilient means and a movement of the striker from the vibrator in accordance with such constraint and to produce a striking of the striker against the resilient means upon release of such constraint; and a member movable initially in a particular direction from a first position and disposed relative to the resilient means to obtain a constraint of the resilient means upon the initial movement of the member in the particular direction from the first position and movable further in the particular direction to a second position to obtain a release of the constraint on the resilient means, the first and second positions of the movable member relative to the resilient means being substantially identical upon the release of the constraint on the resilient means.

8. In combination for obtaining a transmission of energy to a removed position to produce a control effect at the removed position:

an elongated vibrator constructed to vibrate in a longitudinal mode;

a striker disposed relative to the vibrator to strike the vibrator for the production of vibrations of the vibrator in the longitudinal mode;

stationary support means;

a bracket extending from the stationary support means;

a retaining member supported by the bracket and made from a pliant material and provided with an opening to receive the vibrator, the vibrator being disposed within the opening in the retaining member in bonded relationship to the retaining member;

resilient means operatively connected to the striker at one end and connected to the stationary support means at the other end to obtain a constraint of the resilient means and a movement of the striker from the vibrator in accordance with such constraint and to produce an impact of the striker against the resilient means upon the release of such constraint; and a manually movable member directly coupled to the resilient means for the constraint of the resilient means in accordance with an initial manual movement of the member in a first direction through a first particular distance from a first position and releasable from the resilient means upon a subsequent manual movement of the member in the first direction through a second particular distance to a second position to obtain a release of the constraint on the resilient means, the position of the manually movable member in the second position relative to the resilient member upon the release of the constraint on the resilient means corresponding to the position of the manually movable member relative to the resilient means in the first position.

9. In combination for obtaining a transmission of energy to a removed position to produce a control effect at the removed position:

a housing;

a first member disposed within the housing and constructed to transmit signals at a particular frequency upon the imposition of vibrations in the member and provided with a nodal position;

a second member disposed within the housing relative to the first member to obtain an impinging action between the first member and the second member for the imposition of vibrations in the first member;

support means within the housing;

resilient means made from a resilient material and extending from the housing and disposed in homogeneous relationship with the first member at the nodal position of the first member to provide a support for the first member;

a spring disposed within the housing and operatively connected at a first end to the support means and operatively connected at the second end to a particular one of the first and second members for movement of the particular one of the first and second members from the other one of the first and second members in accordance with the imposition of a constraint in the spring and for an impingement between the first and second members upon a release in the constraint in the spring; and a rotatable knob extending from the housing for manual rotation and operatively coupled to the second end of the spring to impose a constraint on the spring upon an initial rotation of the knob in a first angular direction from a first position and to obtain a release of the constraint on the spring upon a further rotation of the knob in the first angular direction to a second position, the relative disposition of the knob and the spring in the second position of the knob after the release of the constraint on the spring corresponding to the relative disposition of the knob and the spring in the first position of the knob.

10. In combination for obtaining a transmission of energy to a removed position to produce a control effect at the removed position:

a housing;

a first member constructed to produce vibrations upon an impact with the member and to obtain a transmission of signals at a particular frequency upon the occurrence of such vibrations;

a second member disposed relative to the first member to obtain an impact between the first and second members for the production of such vibrations in the first member;

a resilient member fixedly coupled to the housing at at first end and free for pivotal constraint at a second end opposite to the first end and operatively coupled to a particular one of the first and second members at a position between the first and second ends for displacement of the particular one of the first and second members from the other one of the first and second members in accordance with the pivotal constraint of the resilient member and for the impact of the particular one of the first and second members against the other one of the first and second members upon the release of the pivotal constraint on the resilient member; and a manually rotatable member and extending partially through the housing and disposed within the housing directly against the resilient member at the second end of the resilient member to obtain a pivotal constraint of the resilient member upon an initial movement of the manually movable member in a first direction from a first position and to obtain a release of the pivotal constraint on the resilient member upon a further movement of the manually movable member in the first direction to a second position, the manually movable member being disposed in the first and second positions in the same operative relationship with respect to the resilient member upon the release of the constraint on the resilient member.

11. In combination for obtaining a transmission of energy to a removed position to produce a control effect at the removed position:

a housing;

a first member disposed within the housing and constructured to produce vibrations upon an impact with the member and to obtain a transmission of signals at a particular frequency upon the occurrence of such vibrations;

a second member disposed within the housing relative to the first member to obtain an impact between the first and second members for the production of such vibrations in the first member;

a resilient member disposed within the housing and fixedly coupled to the housing at a first end and freely pivotable from a position of rest at a second end opposite to the first end and operatively connected to a particular one of the first and second members at a position near the second end of the resilient member for a displacement of the particular one of the first and second members from the other one of the first and second members upon a pivotable movement of the second end of the resilient member from the position of rest and for an impact of the particular one of the first and second members against the other one of the first and second members upon a release of the resilient member from a pivotally displaced position to the position of rest;

a control member disposed within the housing and provided with a disc-like configuration and extending partially through the housing and pivotally coupled to the housing and directly coupled to the resilient member at the second end of the resilient member to obtain a pivotal displacement of the second end of the resilient member from the position of rest upon an initial rotation of the control member in a particular direction from a first position and to obtain a release of the resilient member to the position of rest upon a subsequent rotation of the control member in the particular direction to a second position, the relative dispositions of the control member and the resilient member in the first and second positions being similar upon a release of the resilient member during the movement of the control member to the second position; and means disposed within the housing and operatively coupled to the control member to prevent the rotation of the control member in a direction opposite to the particular direction.

12. In combination for obtaining a transmission of energy to a removed position to produce a control effect at the removed position:

a housing, there being an opening in the housing;

a first member disposed within the housing and constructed to produce vibrations upon an impact against the first member and to obtain a transmission of a signal at a particular frequency upon the occurrence of such vibrations;

a second member disposed within the housing and disposed relative to the first member to obtain an impact between the first and second members for the production of such vibrations;

a bracket disposed within the housing and fixedly attached to the housing and provided with an opening;

retaining means made from an elastic material and disposed within the opening in the bracket and bonded to the first member at an intermediate position along the length of the first member;

a resilient member disposed within the housing and supported by the housing at a first end thereof and pivotable at a second end opposite to said first end and operatively coupled to a particular one of the first and second members at a position near the second end of the resilient member for displacement of the particular one of the said first and second members from the other one of said first and second members in accordance with the pivotal constraint of the resilient member and for the impact of the particular one of said first and second members against the other one of said first and second members upon the release of the pivotal constraint on the resilient member; and a control member extending through the opening in the housing for manual operation and disposed in abutting relationship to said second end of the resilient member to obtain a pivotal constraint of the resilient member upon an initial manual operation of the control member in a first direction from a first position and to obtain a release of the resilient member from the control member upon a further manual operation of the control member in said first direction to a second position, the disposition of the control member relative to the resilient member in said first position of the control member corresponding to the disposition of the control member relative to the resilient member in the second position of the control member after the release of the resilient member.

13. The combination set forth in claim 6, including, means operatively associated with the manually operable actuating member to provide for a movement of the member only in the particular direction.

14. The combination set forth in claim 11 in which an elastic member is provided with an opening and is fixedly coupled to the housing and in which the first member is disposed in the opening in the elastic member with a homogeneous relationship between the first member and the elastic member for extended distances around the complete periphery of the elastic member.

15. The combination set forth in claim 6 in which means are operatively coupled to the actuating member to prevent the actuating member from moving in a direction opposite to the particular direction.

References Cited in the file of this patent

UNITED STATES PATENTS

| | | |
|---|---|---|
| 773,646 | Junghans | Nov. 1, 1904 |
| 875,112 | Sanders | Dec. 31, 1907 |
| 1,243,915 | Barnes | Oct. 23, 1917 |
| 1,513,552 | Iadarola | Oct. 28, 1924 |
| 1,720,085 | Meyers | July 9, 1929 |
| 1,985,652 | Campbell | Dec. 25, 1934 |
| 2,728,902 | White | Dec. 27, 1955 |
| 2,750,920 | Tall | June 19, 1956 |
| 2,821,954 | Adler | Feb. 4, 1958 |
| 2,868,156 | De Cola | Jan. 13, 1959 |
| 2,920,604 | McDonald | Jan. 12, 1960 |